(12) United States Patent
Oguchi

(10) Patent No.: US 9,681,200 B2
(45) Date of Patent: Jun. 13, 2017

(54) DATA PROCESSING METHOD AND DEVICE

(71) Applicant: FUJITSU LIMITED, Kawasaki-shi, Kanagawa (JP)

(72) Inventor: Atsushi Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/580,422

(22) Filed: Dec. 23, 2014

(65) Prior Publication Data

US 2015/0208138 A1  Jul. 23, 2015

(30) Foreign Application Priority Data

Jan. 20, 2014 (JP) ................................ 2014-008172

(51) Int. Cl.

| G06K 9/00 | (2006.01) |
|---|---|
| H04N 21/81 | (2011.01) |
| H04N 21/235 | (2011.01) |
| H04N 21/845 | (2011.01) |
| H04N 21/472 | (2011.01) |
| H04N 21/234 | (2011.01) |
| H04N 21/4725 | (2011.01) |
| H04N 21/858 | (2011.01) |

(52) U.S. Cl.
CPC ..... *H04N 21/8126* (2013.01); *G06K 9/00724* (2013.01); *H04N 21/2353* (2013.01); *H04N 21/23418* (2013.01); *H04N 21/4725* (2013.01); *H04N 21/47202* (2013.01); *H04N 21/8455* (2013.01); *H04N 21/8456* (2013.01); *H04N 21/8583* (2013.01); *G06K 9/00744* (2013.01)

(58) Field of Classification Search
CPC .......... G06K 9/00724; G06K 9/00744; G06K 9/00765; H04N 21/8126; H04N 21/2353; H04N 21/47202; H04N 21/8583; H04N 21/8455; H04N 21/8456; H04N 21/4725; H04N 21/23418
See application file for complete search history.

(56) References Cited

U.S. PATENT DOCUMENTS

| 2009/0124197 A1 | 5/2009 | Muneomi |
|---|---|---|
| 2012/0219271 A1* | 8/2012 | Vunic ................ G06K 9/00711 386/278 |

FOREIGN PATENT DOCUMENTS

| JP | 2005-295296 | 10/2005 |
|---|---|---|
| JP | 2007-124368 | 5/2007 |

OTHER PUBLICATIONS

English translation of JP2007-124368.*

(Continued)

*Primary Examiner* — Jon Chang
(74) *Attorney, Agent, or Firm* — Staas & Halsey LLP

(57) ABSTRACT

A data processing device includes a processor that executes a procedure. The procedure includes, in cases in which display of a player name is included in one or more frames among a group of frames related to a given plate appearance extracted from captured baseball game footage that includes plural frames, identifying the displayed player name as the name of the batter of the given plate appearance; and storing the identified name in a storage device as a batter name corresponding to the group of frames related to the given plate appearance.

8 Claims, 22 Drawing Sheets

(56) References Cited

OTHER PUBLICATIONS

Zhang et al. "General and Domain-Specific Techniques for Detecting and Recognizing Superimposed Text in Video." International Conference on Image Processing, 2002, vol. 1, pp. I-593-I-596.*
Jung et al. "Player Information Extraction for Semantic Annotation in Golf Videos." IEEE Transactions on Broadcasting, vol. 55, No. 1, Mar. 2009, pp. 79-83.*
Korean Office Action dated Mar. 7, 2016 in corresponding Korean Patent Application No. 10-2014-0191976.
Espacenet English Abstract of Japanese Publication No. 2007-124368, published May 17, 2007.
Patent Abstracts of Japan, Publication No. 2005-295296, published Oct. 20, 2005.
Taiwanese Office Action dated May 18, 2016 in corresponding Taiwanese Patent Application No. 103144776.

* cited by examiner

FIG.8

| BATTING SEQUENCE | JERSEY NUMBER | NAME |
|---|---|---|
| 1 | 11 | A |
| 2 | 22 | B |
| 3 | 5 | C |
| 4 | 10 | D |
| 5 | 19 | D |
| 6 | 30 | F |
| 7 | 23 | G |
| 8 | 1 | H |
| 9 | 3 | I |

| BATTING SEQUENCE | JERSEY NUMBER | NAME | PINCH RUNNER | PINCH HITTER |
|---|---|---|---|---|
| 1 | 11 | A | | |
| 2 | 22 | Z | | |
| 3 | 5 | C | | |
| 4 | 10 | D | | |
| … | … | … | | |

| BATTING SEQUENCE | JERSEY NUMBER | NAME | PINCH RUNNER | PINCH HITTER |
|---|---|---|---|---|
| 1 | 11 | A | | |
| 2 | 22 | Z | 1 | |
| 3 | 5 | C | | |
| 4 | 10 | D | | |
| … | … | … | | |

FIG.24

|  |  | NUMBER OF RUNNERS | OUT COUNT | SCORE | TOTAL | CHANGE IN BATTER |
|---|---|---|---|---|---|---|
| STATE ONE PITCH BEFORE | | 1 | 0 | 0 | 1 | – |
| RESULT OF CURRENT PITCH | HIT | 2 | 0 | 0 | 2 | YES |
| | RBI HIT | 1 | 0 | 1 | 2 | YES |
| | HOME RUN | 0 | 0 | 2 | 2 | YES |
| | OUT | 1 | 1 | 0 | 2 | YES |
| | DOUBLE PLAY | 0 | 2 | 0 | 2 | YES |
| | SACRIFICE FLY SQUEEZE | 0 | 1 | 1 | 2 | YES |
| | SACRIFICE HIT (ONLY TO GAIN A BASE) | 1 | 1 | 0 | 2 | YES |
| | PICKOFF (SAFE) | 1 | 0 | 0 | 1 | NO |
| | PICKOFF (OUT) | 0 | 1 | 0 | 1 | NO |
| | WILD PITCH ETC. (SCORED) | 0 | 0 | 1 | 1 | NO |
| | WILD PITCH ETC. (ONLY TO GAIN A BASE) | 1 | 0 | 0 | 1 | NO |

US 9,681,200 B2

DATA PROCESSING METHOD AND DEVICE

CROSS-REFERENCE TO RELATED APPLICATION

This application is based upon and claims the benefit of priority of the prior Japanese Patent Application No. 2014-008172, filed on Jan. 20, 2014, the entire content of which is incorporated herein by reference.

FIELD

The embodiments discussed herein are related to a data processing program, a storage medium stored with the data processing program, a data processing method, a data processing device, a baseball footage metadata generation device, a baseball footage metadata generation method, a baseball footage metadata generation program, and a storage medium stored with the baseball footage metadata generation program.

BACKGROUND

Known services exist that distribute captured baseball game footage live, and distribute captured baseball game footage as video on demand (VoD) content. When distributed as VoD content, for example, the viewer selects a desired inning, which is then presented to the viewer in a viewable form. In order to present such VoD content, footage is manually extracted for each inning.

Technology has been proposed that extracts highlight scenes from captured baseball game footage.

RELATED PATENT DOCUMENTS

Japanese Laid-Open Patent Publication No. 2005-295296

SUMMARY

According to an aspect of the embodiments, a non-transitory recording medium stores a program that causes a computer to execute a data processing process. The process includes, in cases in which display of a player name is included in one or more frames among a group of frames related to a given plate appearance extracted from captured baseball game footage that includes a plurality of frames, identifying the displayed player name as the name of the batter of the given plate appearance, and storing the identified name in a storage device as a batter name corresponding to the group of frames related to the given plate appearance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a batter list;

FIG. 24 is a diagram explaining determination of a batter change based on a total of a number of runners, an out count, and a score.

DESCRIPTION OF EMBODIMENTS

An example of an exemplary embodiment according to the technology disclosed herein is explained in detail below with reference to the drawings. In the present exemplary embodiment, explanation is given regarding an example of a baseball footage metadata generation device applied to a footage distribution system.

First Exemplary Embodiment

Figure 1:
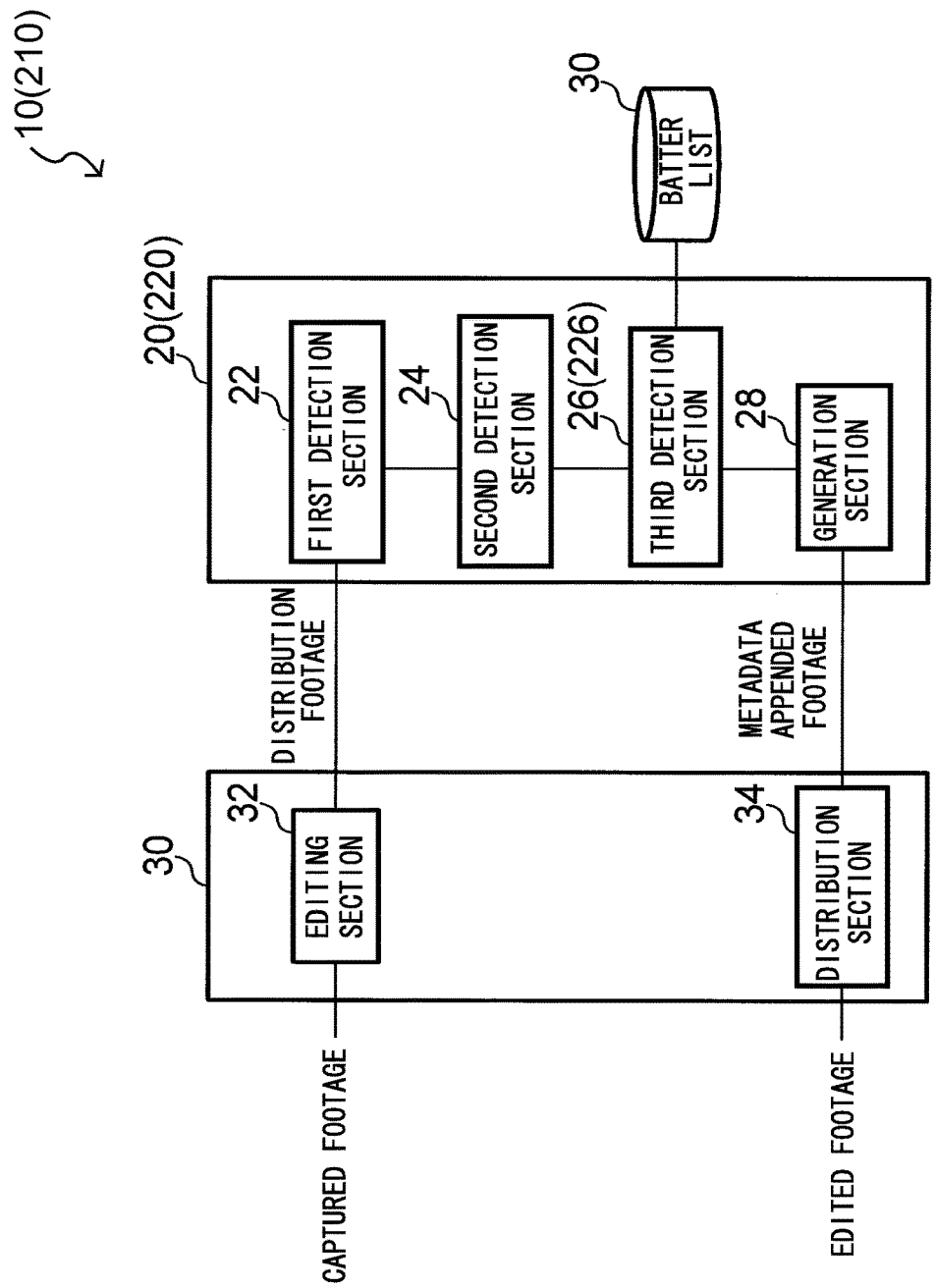
FIG. 1 is a functional block diagram illustrating a schematic configuration of a footage distribution system according to a first and a second exemplary embodiment.

As illustrated in FIG. 1, a footage distribution system 10 according to a first exemplary embodiment includes a baseball footage metadata generation device 20, and a distribution device 30. The baseball footage metadata generation device 20 and the distribution device 30 are connected through a network. In the footage distribution system 10, footage to which metadata generated by the baseball footage metadata generation device 20 has been added, is distributed through the network to a specified terminal by the distribution device 30. The baseball footage metadata generation device 20 includes a first detection section 22, a second detection section 24, a third detection section 26, and a generation section 28. The distribution device 30 includes an editing section 32, and a distribution section 34.

First, detailed explanation is given regarding individual sections of the distribution device 30.

The editing section 32 acquires footage capturing a baseball game (referred to as "captured footage" hereafter). The captured footage is footage captured at a frame rate such as 30 fps, or 60 fps for example, and includes plural frames. Each frame is associated to time data indicating an elapsed time since the start of capture of the captured footage.

Figure 2:
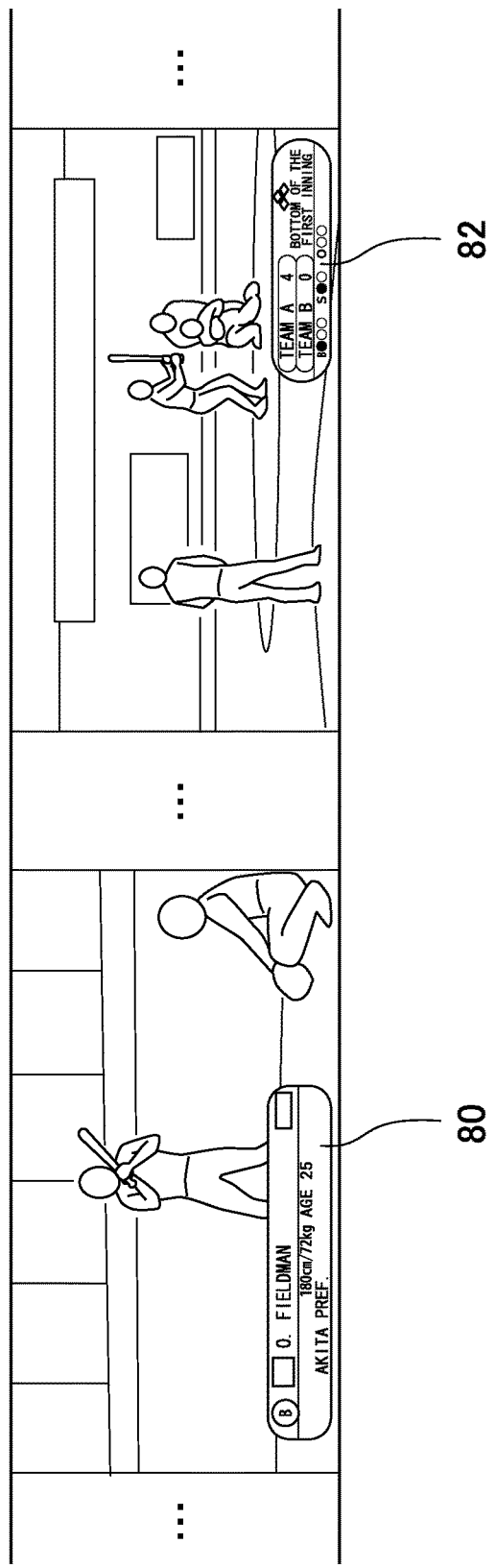
FIG. 2 is a diagram explaining an example of editing.

The editing section 32 applies editing commands, designated by operation of an operator using a display device and input device, not illustrated in the drawings, to the captured footage using image processing. As illustrated in FIG. 2, for example, the editing commands include adding an overlay 80 showing player data, and an overlay 82 showing the game status, for each frame corresponding to a specified scene in the captured footage. Footage in which editing has been performed on the captured footage by the editing section 32 is referred to as "edited footage" below. The editing section 32 transmits edited footage to the baseball footage metadata generation device 20.

The distribution section 34 acquires footage to which metadata generated by the baseball footage metadata generation device 20 has been added (referred to as "metadata appended footage" below; detailed explanation is given below). The metadata appended footage is converted to distribution footage according to specified standards, and distributed to a distribution destination terminal (not illustrated in the drawings) by the distribution section 34.

Next, detailed explanation follows regarding individual sections of the baseball footage metadata generation device 20.

Figure 3:
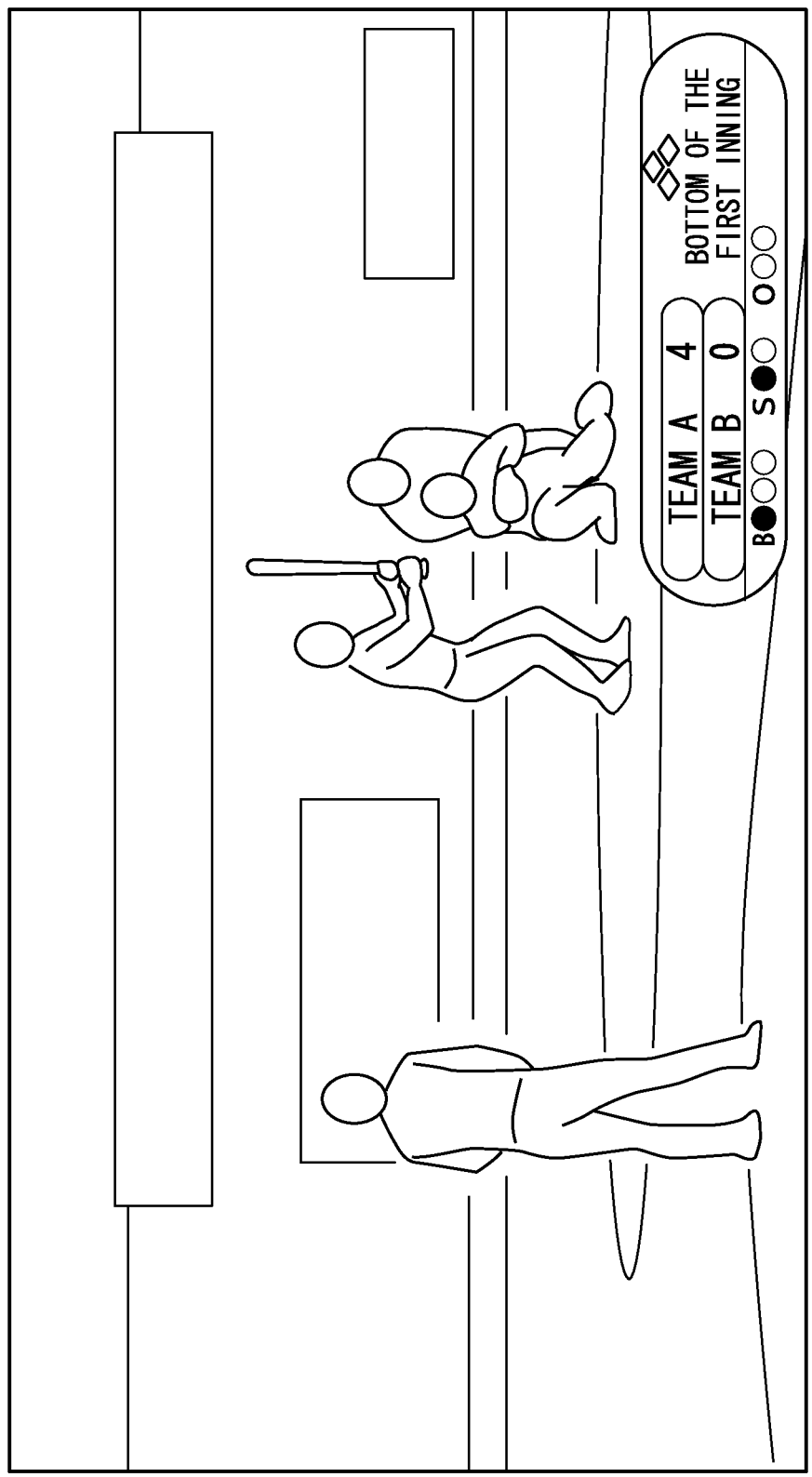
FIG. 3 is a diagram explaining a specific cut.

The first detection section 22 acquires edited footage transmitted by the distribution device 30. The first detection section 22 extracts from respective plural frames included in the edited footage, frames representing a cut captured at a camera angle used in a pitcher's pitching scenes (referred to as the "specific cut" hereafter). Note that a cut is a continuous segment captured at the same camera angle. In the present exemplary embodiment explanation follows regarding a case in which the specific cut is a cut captured in a batter-direction from behind the pitcher, as illustrated in FIG. 3.

Specifically, the first detection section 22 extracts image characteristics for each frame. The image characteristics are characteristics represented by pixel data such as the luminance and color of each pixel inside the frame. The first detection section 22 derives a similarity value between the reference image characteristics extracted from a pre-prepared frame representing the specific cut, and extracted image characteristics extracted from each frame of the edited footage. The first detection section 22 extracts as frames representing the specific cut, any frames with extracted image characteristics having a similarity value to the reference image characteristics of a specified value or greater.

The first detection section 22 may employ characteristics representing image configuration (composition), characteristics representing, for example, color and luminance placement and distribution, characteristics obtained by a wavelet transform, and the like as the image characteristics. When such image characteristics are extracted, these characteristics may be extracted from the whole of each frame, or may be characteristics extracted from a portion of each frame (for example, a ballpark fence, or wall region included in the captured footage). In actual captured footage, even for the same specific cut considerable discrepancies can arise in the configuration of the image, such as slight variations in camera angle, differences in where players stand, changes to background signboards, and the like. When image characteristics are extracted from the whole of frames, image characteristics may be extracted that suppress the effects of such considerable discrepancies arising in the configuration of the image. For example when image characteristics are extracted from a portion of a frame, image characteristics are extracted from a region that excludes a region, such as a region representing a background signboard for example, in which considerable variation arises in the configuration of the image. Employing image characteristics extracted in this manner enables an increase in precision of similarity determination.

Plural types of reference image characteristics may be prepared in consideration of differences in the background of each ballpark, different colors of uniforms worn by players, variation in overlay formats of each broadcaster, and the like. In such cases, the first detection section 22 may acquire data such as the ballpark, the teams, and the broadcaster, together with the edited footage, and may select and use the reference image characteristics in accordance with the acquired data. Regarding variation in camera angle, it is conceivable that variations in camera angle and image characteristics may arise depending on the dominant hand of the pitcher or batter. Accordingly, reference image characteristics may be prepared for different pitcher and batter dominant hands (for example, four patterns such as pitcher: left-handed throw and batter: left-handed bat, pitcher: left-handed throw and batter: right-handed bat, pitcher: right-handed throw and batter: left-handed bat, and pitcher: right-handed throw and batter: right-handed bat). Then, the frames representing the specific cut may be extracted when one of the prepared reference image characteristics is matched.

The first detection section 22 may extract, as image characteristics, characteristics indicating movement that characteristically indicates players in footage of the specific cut, such as the pitching form of the pitcher. For example, a movement vector at a characteristic point may be extracted as an image characteristic. In such cases, even when the ballpark, the teams, the overlay format, and the like vary, image characteristics that suppress the effects of such variation can be extracted.

Figure 4:
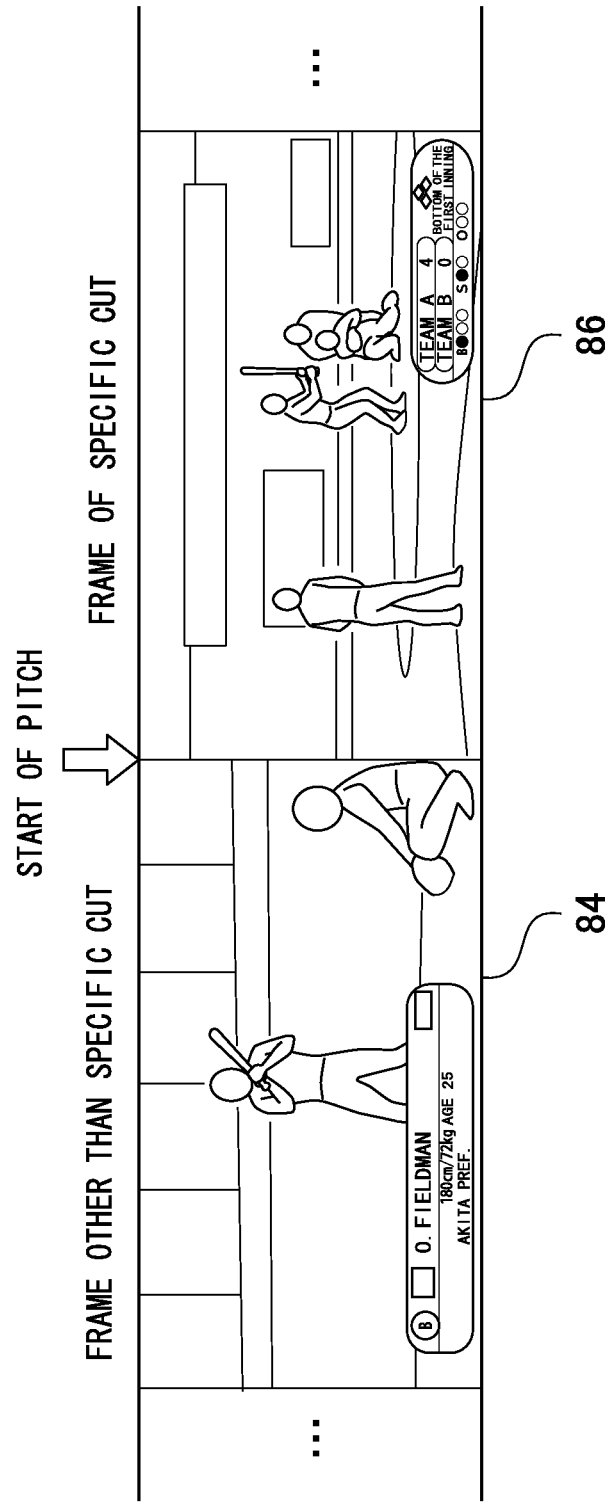
FIG. 4 is a diagram explaining a frame representing the start of a pitch.

Based on frames representing the extracted specific cut, the first detection section 22 detects as frames representing the start of a pitch, frames in which transition was made from a frame other than frames representing specific cuts, to a frame representing a specific cut. For example, as illustrated in FIG. 4, a frame 84 is considered a frame other than the frames representing specific cuts, and a frame 86 that follows the frame 84 is considered a frame that represents a specific cut. In this case, the first detection section 22 detects the frame 86 as a frame representing the start of a pitch.

Figure 5:
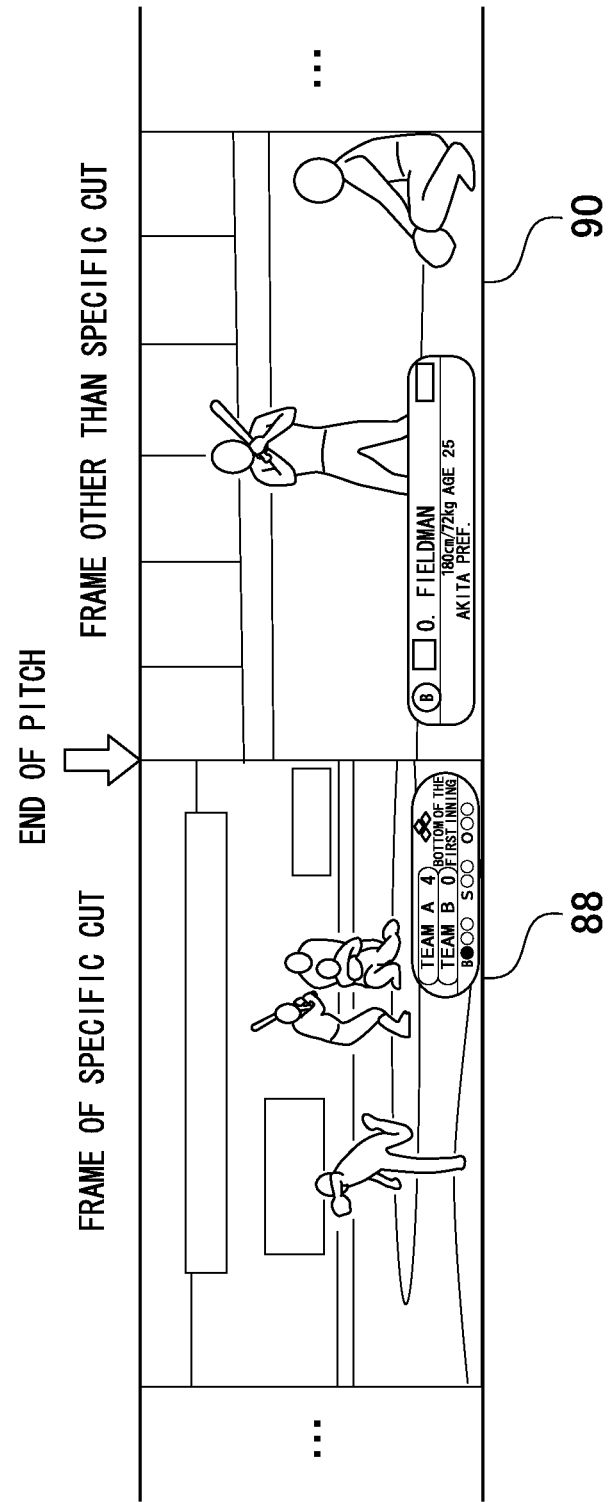
FIG. 5 is a diagram explaining a frame representing the end of a pitch.

The first detection section 22 detects as frames representing the end of a pitch, frames in which transition was made from a frame representing a specific cut, to a frame other than the frames representing specific cuts. For example, as illustrated in FIG. 5, a frame 88 is considered a frame representing a specific cut, and a frame 90 that follows the frame 88 is considered a frame other than the frames representing specific cuts. In this case, the first detection section 22 detects the frame 88 as a frame representing the end of a pitch. Namely, the first detection section 22 detects a segment in which frames representing a specific cut, from a frame representing the start of a pitch to a frame representing the end of a pitch, are consecutive as a segment representing a single pitch by a pitcher.

Figure 6:
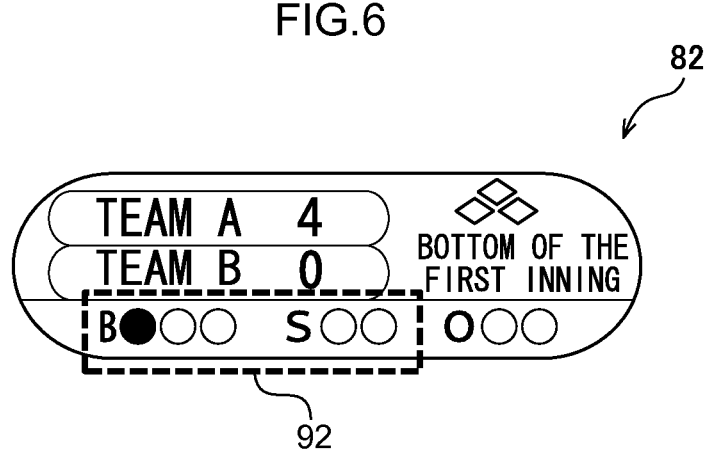
FIG. 6 is a diagram illustrating an example of an overlay that displays a game status.

For each segment detected by the first detection section 22, the second detection section 24 determines whether or not the ball count display in the segment is in an initial state. Specifically, the second detection section 24 extracts a ball count display displaying a ball count from the overlay 82 displaying game status included in at least one frame in each segment. The ball count is a determination result of whether pitches by a pitcher were balls or strikes. The second detection section 24 extracts a ball count display 92, like that illustrated in FIG. 6 for example, from the overlay 82 displaying the game status added to frames in the segment. Extraction of the ball count display 92 may, for example, be an extraction of a predetermined region as a region displaying an overlay displaying the game status in the frame, or an extraction using pattern matching. Moreover, the ball count display may be extracted using character recognition processing. In the example of FIG. 6, "B●∘∘S∘∘" (1 ball, 0 strikes) is extracted as the ball count display.

In consideration of variation in the format of the overlay for each editor of the edited footage or broadcaster, the format of the overlay to be extracted may be changed as appropriate for each editor of the edited footage or broadcaster. Data that specifies plural respective overlay formats corresponding to plural respective editors of edited footage or plural broadcasters may be pre-stored in the storage section 46 to be used as appropriate by the second detection section 24 for each editor of the edited footage or broadcaster.

The second detection section 24 determines whether or not the ball count display extracted for each segment shows the initial state, namely, a ball count of 0 balls and 0 strikes (denoted "0-0" below; similar applies to other ball counts). This determination may be performed using pattern matching or character recognition processing. When the ball count display displays the initial state, the second detection section 24 detects that segment as a segment representing the start of a plate appearance. Namely, from a segment representing the start of a plate appearance, up to a segment before the segment representing the start of the next plate appearance, is a segment representing a plate appearance.

Figure 7:
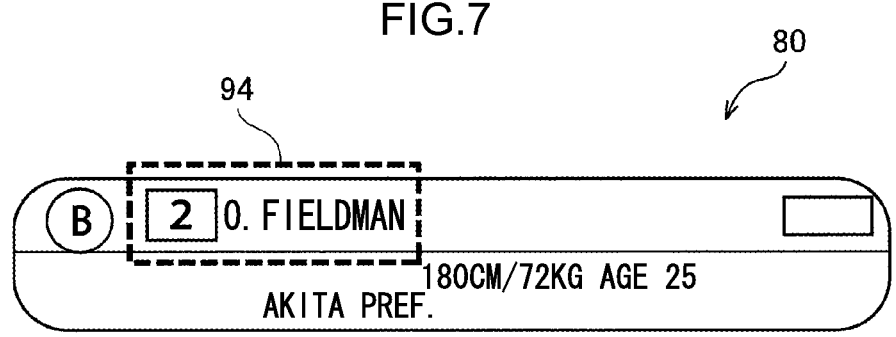
FIG. 7 is a diagram illustrating an example of an overlay displaying player data.

The third detection section 26 detects player identification data based on the overlay 80 displaying player data included in frames corresponding to the segment representing the start of the plate appearance as detected by the second detection section 24. As illustrated in FIG. 7, the overlay 80 displaying player data includes a player identification data display 94 such as a player name and jersey number. Here, the frames corresponding to the segment representing the start of a plate appearance are frames included from the end of the segment representing the previous plate appearance, up to the end of the segment representing the target plate appearance. Detection of player identification data corresponding to a plate appearance with greater precision is thereby enabled, including cases in which the overlay 80 displaying player data is displayed before the first pitch of a plate appearance.

Specifically, the third detection section 26 extracts character data by performing character recognition processing on the whole or a portion of the corresponding frames. Performing character recognition processing on a portion of a frame may be performed on a predetermined region serving as a region displaying the overlay 80 that displays player data in the frame. When extracting character data from the whole of the frame, sometimes character data is also extracted from background signboards or the like. Moreover, recognition errors sometimes occur even in cases in which the character data is extracted from the region of the overlay 80 displaying player data. Therefore, the third detection section 26 detects the player identification data by cross-referencing the extracted character data against the batter list 30.

Figure 9:
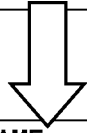
FIG. 9 is a diagram illustrating an example of updating a batter list.

The batter list 30 is a list of batters participating in the game, and for example, may be a list registered with the jersey numbers, and names of players in batting sequence, as illustrated in FIG. 8. The batter list 30 may be stored in a specified storage region in the baseball footage metadata generation device 20, or may be stored on an external device. Moreover, the batter list 30 may be updated according to game status. Data for updates may be acquired from baseball websites where game data is publically accessible, or acquired from service providers offering baseball data. As illustrated in FIG. 9, for example, data on pinch runners, and pinch hitters may also be included in the batter list 30. The example of FIG. 9 indicates that player "Z" has been sent up to pinch run for player "B".

When the extracted character data matches player identification data registered in the batter list 30, the third detection section 26 detects the matched player identification data. Employing the batter list 30 in this manner enables erroneous detection of batter identification data to be prevented, even when character data for pitchers or pinch runners is extracted from the overlay 80 that displays player data.

The generation section 28 generates metadata indicating the start of each pitch by a pitcher, and metadata indicating the end of each pitch, based on the frames detected by the first detection section 22. Specifically, the generation section 28 generates metadata that associates data representing the starts of the pitches to time data associated to the frames representing the start of a pitch as detected by the first detection section 22. Similarly, the generation section 28 generates metadata that associates data representing the ends of the pitches to time data associated to the frames representing the end of a pitch as detected by the first detection section 22. Note that the generation section 28 may associate the metadata to frames.

The generation section 28 generates metadata indicating the start of each plate appearance, and metadata indicating the end of each plate appearance based on segments detected by the second detection section 24. Specifically, the generation section 28 generates metadata that associates data indicating the starts of plate appearances to time data associated to the leading frames of segments detected by the second detection section 24. Similarly, the generation section 28 generates metadata that associates data indicating the ends of plate appearances, to time data associated to the final frames in segments prior to the segments detected by the second detection section 24.

Moreover, the generation section 28 generates metadata that associates player identification data that the third detection section 26 detected to correspond to a segment representing a plate appearance to that segment representing the plate appearance.

Figure 10:
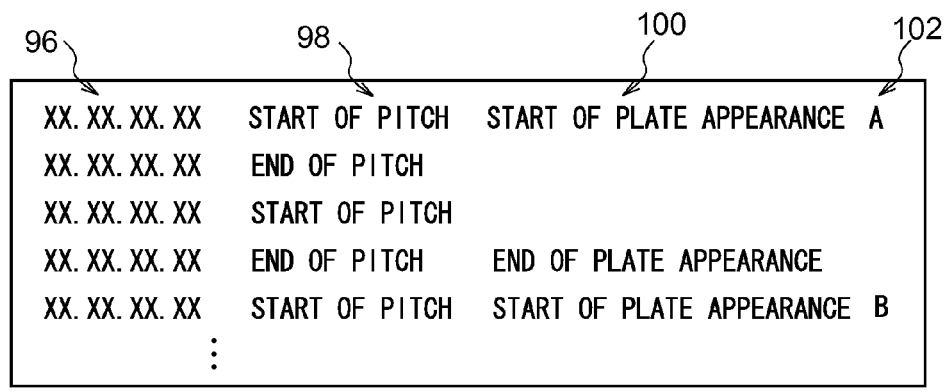
FIG. 10 is a diagram illustrating an example of a metadata file.

The generation section 28 generates a metadata file that stores the plural generated metadata in the sequence of the time data included in the metadata. The metadata file may be generated as a file formatted as, for example, a csv (comma-separated values) file. An example of a metadata file is illustrated in FIG. 10. In the example of FIG. 10, each row represents a single item of metadata, and each item of metadata includes time data 96, data representing the start or end of a pitch (reference numeral 98), data representing the start or end of a plate appearance (reference numeral 100), and player identification data 102.

Although explanation is given here regarding a case in which metadata is generated using time data associated to frames, metadata may be generated using other data for identifying respective frames, such as frame numbers.

The edited footage is appended with the generated metadata file, and transmitted by the generation section 28 to the distribution device 30 as the metadata appended footage.

Figure 11:
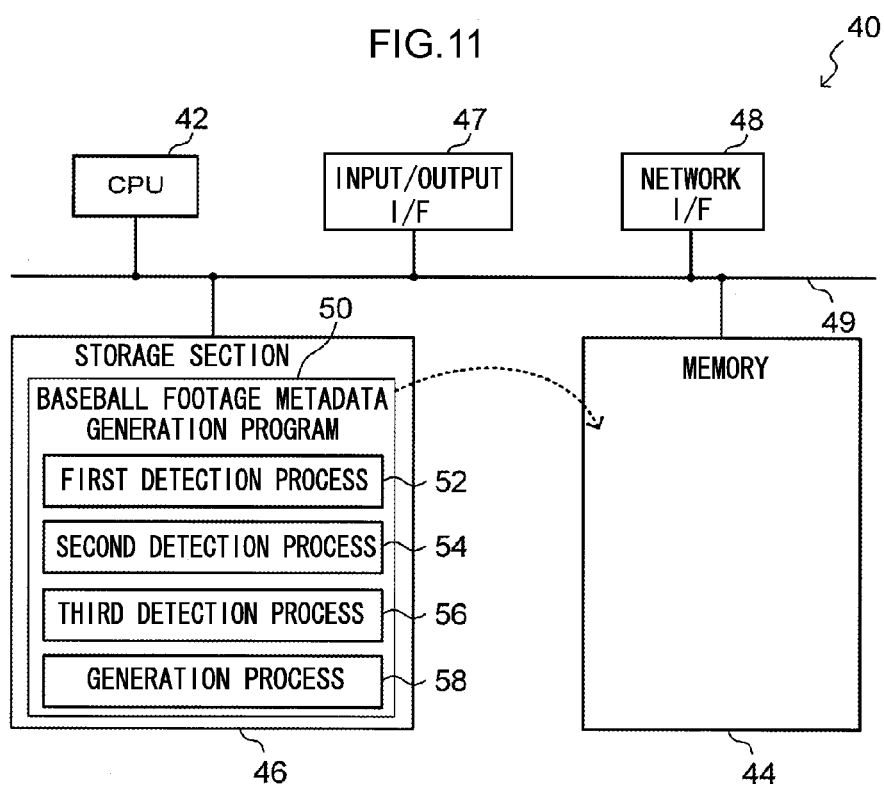
FIG. 11 is a schematic block diagram illustrating an example of a computer that functions as a baseball footage metadata generation device.

The baseball footage metadata generation device 20 may be implemented by, for example, a computer 40 illustrated in FIG. 11. The computer 40 includes a CPU 42, memory 44, a non-volatile storage section 46, an input/output interface (I/F) 47, and a network I/F 48. The CPU 42, the memory 44, the storage section 46, the input/output I/F 47, and the network I/F 48 are mutually connected through a bus 49.

The storage section 46 may be implemented by a hard disk drive (HDD), flash memory, or the like. The storage section 46, serving as a storage medium, is stored with a baseball footage metadata generation program 50 that causes the computer 40 to function as the baseball footage metadata generation device 20. The baseball footage metadata generation program 50 is read from the storage section 46, and expanded into the memory 44, and a process including the baseball footage metadata generation program 50 sequentially executed by the CPU 42.

The baseball footage metadata generation program 50 includes a first detection process 52, a second detection process 54, a third detection process 56, and a generation process 58. The CPU 42 operates as the first detection section 22 illustrated in FIG. 1 by executing the first detection process 52. The CPU 42 operates as the second detection section 24 illustrated in FIG. 1 by executing the second detection process 54. The CPU 42 operates as the third detection section 26 illustrated in FIG. 1 by executing the third detection process 56. The CPU 42 operates as the generation section 28 illustrated in FIG. 1 by executing the generation process 58. Thus, the computer 40 executing the baseball footage metadata generation program 50 functions as the baseball footage metadata generation device 20.

Figure 12:
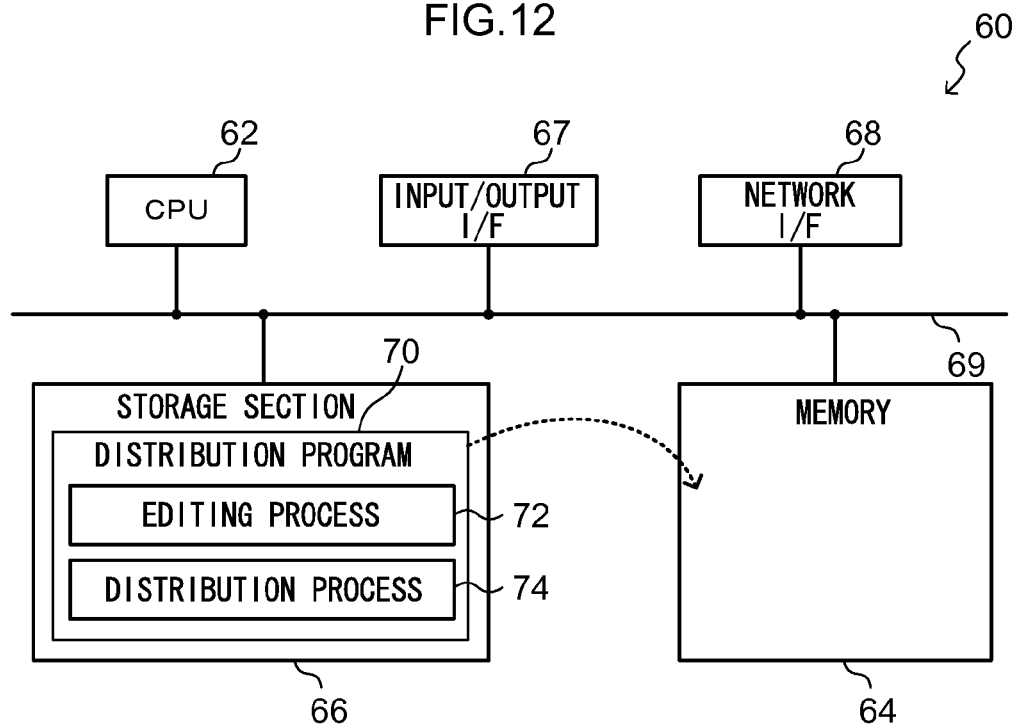
FIG. 12 is a schematic block diagram illustrating an example of a computer that functions as a distribution device.

The distribution device 30 may be implemented by, for example, a computer 60 illustrated in FIG. 12. The computer 60 includes a CPU 62, memory 64, a non-volatile storage section 66, an input/output I/F 67, and a network I/F 68. The CPU 62, the memory 64, the storage section 66, the input/output I/F 67, and the network I/F 68 are mutually connected through a bus 69. Moreover, a display device and an input device, not illustrated in the drawings, are connected to the computer 60 through the input/output I/F 67.

The distribution device 30 and the baseball footage metadata generation device 20 are connected through the network I/F 68 of the distribution device 30, the network, and the network interface 48 of the baseball footage metadata generation device 20.

The storage section 66 may be implemented by a HDD, flash memory, or the like. The storage section 66, serving as a storage medium, is stored with a distribution program 70 that causes the computer 60 to function as the distribution device 30. The distribution program 70 is read from the storage section 66 and expanded into the memory 64, and a process including the distribution program 70 is sequentially executed by the CPU 62.

The distribution program 70 includes an editing process 72, and a distribution process 74. The CPU 62 operates as the editing section 32 illustrated in FIG. 1 by executing the editing process 72. Moreover, the CPU 62 operates as the distribution section 34 illustrated in FIG. 1 by executing the distribution process 74. Thus, the computer 60 executing the distribution program 70 functions as the distribution device 30.

Note that the baseball footage metadata generation device 20, and the distribution device 30 can respectively be implemented by, for example, a semiconductor integrated circuit, more specifically, by an application specific integrated circuit (ASIC), or the like.

Next, explanation is given regarding operation of the footage distribution system 10 according to the first exemplary embodiment. When the captured footage is input to the distribution device 30, the distribution device 30 executes editing processing illustrated in FIG. 13, and outputs the edited footage. Next, when the edited footage is input to the baseball footage metadata generation device 20, the baseball footage metadata generation device 20 executes baseball footage metadata generation processing illustrated in FIG. 14, and outputs the metadata appended footage. Then, when the metadata appended footage is input to the distribution device 30, the distribution device 30 executes distribution processing illustrated in FIG. 15, and outputs the distribution footage. Each processing is described in detail below.

Figure 13:
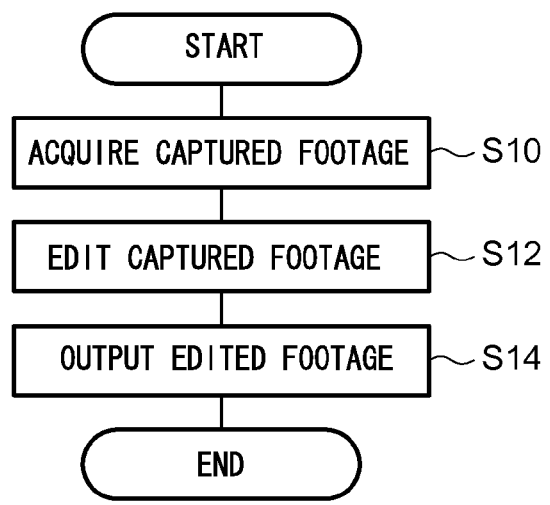
FIG. 13 is a flowchart illustrating an example of editing processing.

First, at step S10 of the editing processing illustrated in FIG. 13, the editing section 32 acquires the captured footage. Next, at step S12, the editing section 32 applies editing commands, designated by the operation of an operator using the display device and input device, not illustrated in the drawings, to the captured footage using image processing. Next, at step S14, the editing section 32 transmits the edited footage to the baseball footage metadata generation device 20, and the editing processing ends.

Figure 14:
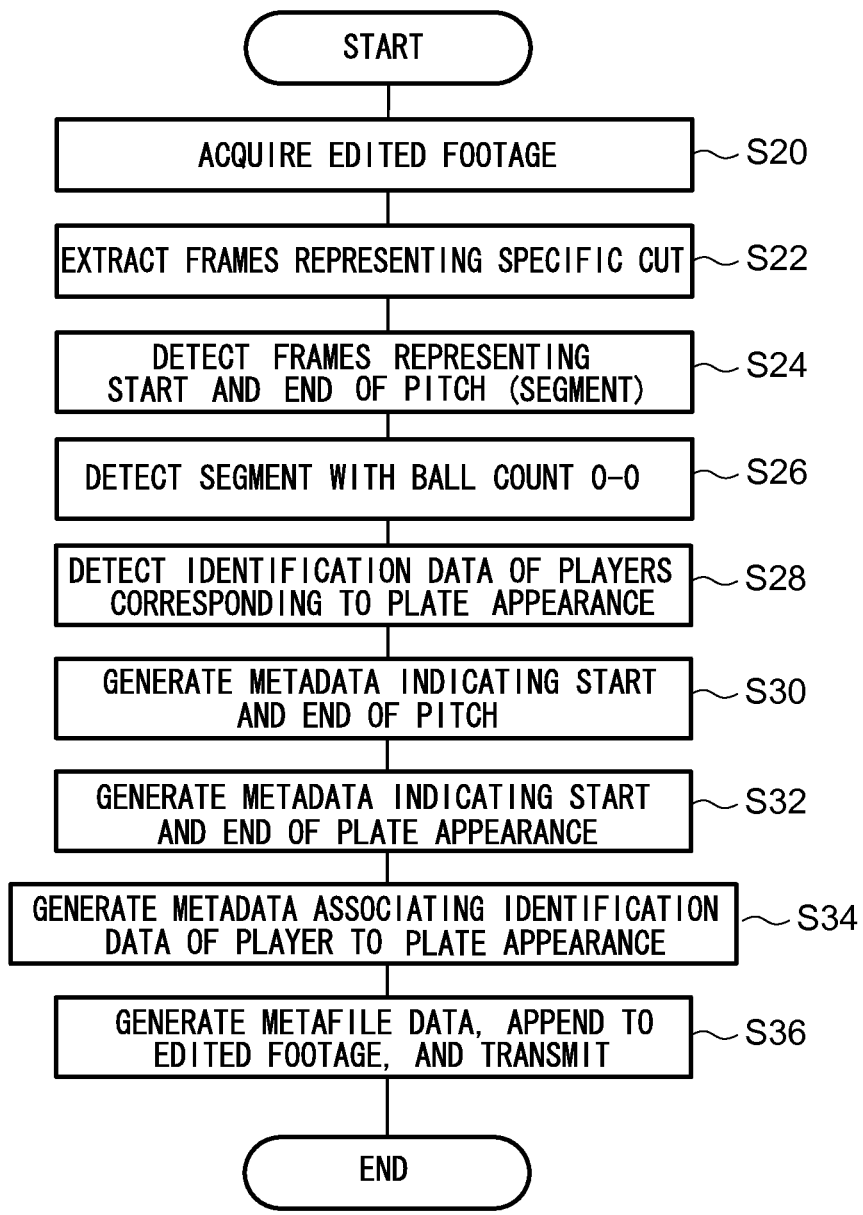
FIG. 14 is a flowchart illustrating an example of baseball footage metadata generation processing according to the first exemplary embodiment.

Next, at step S20 of the baseball footage metadata generation processing illustrated in FIG. 14, the first detection section 22 acquires the edited footage transmitted from the distribution device 30.

Next, at step S22, the first detection section 22 extracts frames representing the specific cut from each of plural frames included in the edited footage. Specifically, the first detection section 22 extracts extracted image characteristics from each of the plural frames included in the edited footage. Then, the first detection section 22 derives the similarity value between the pre-prepared reference image characteristics and the extracted image characteristics, and frames with extracted image characteristics having a similarity value to the reference image characteristics of the specified value or greater are extracted as frames representing the specific cut.

Next, at step S24, based on the frames representing the extracted specific cuts, the first detection section 22 detects as a frame representing the start of a pitch, frames in which transition was made from a frame other than frames representing the specific cuts, to a frame representing a specific cut. Similarly, the first detection section 22 detects as a frame representing the end of a pitch, frames in which transition was made from a frame representing a specific cut, to a frame other than frames representing the specific cuts. Namely, the first detection section 22 detects a segment in which frames representing a specific cut, from a frame representing the start of a pitch to a frame representing the end of a pitch, are consecutive as a segment representing a single pitch by a pitcher.

Next at step S26, the second detection section 24 extracts the ball count display displaying the ball count from the overlay 82 displaying the game status included in at least one frame in each of the segments detected by the first detection section 22. Then, the second detection section 24 detects any segments in which the ball count display displays an initial state (0-0) as segments indicating the start of a plate appearance.

Next, at step S28, the third detection section 26 performs character recognition processing on the whole, or a portion of a frame corresponding to a segment representing the start of a plate appearance as detected by the second detection section 24, and extracts character data. Frames corresponding to the segment representing the start of a plate appearance are the frames included from the end of the segment representing the previous plate appearance, up to the end of the segment representing the target plate appearance. Then, when the extracted character data matches player identification data registered in the batter list 30, the third detection section 26 detects the matching player identification data.

Figure 16:
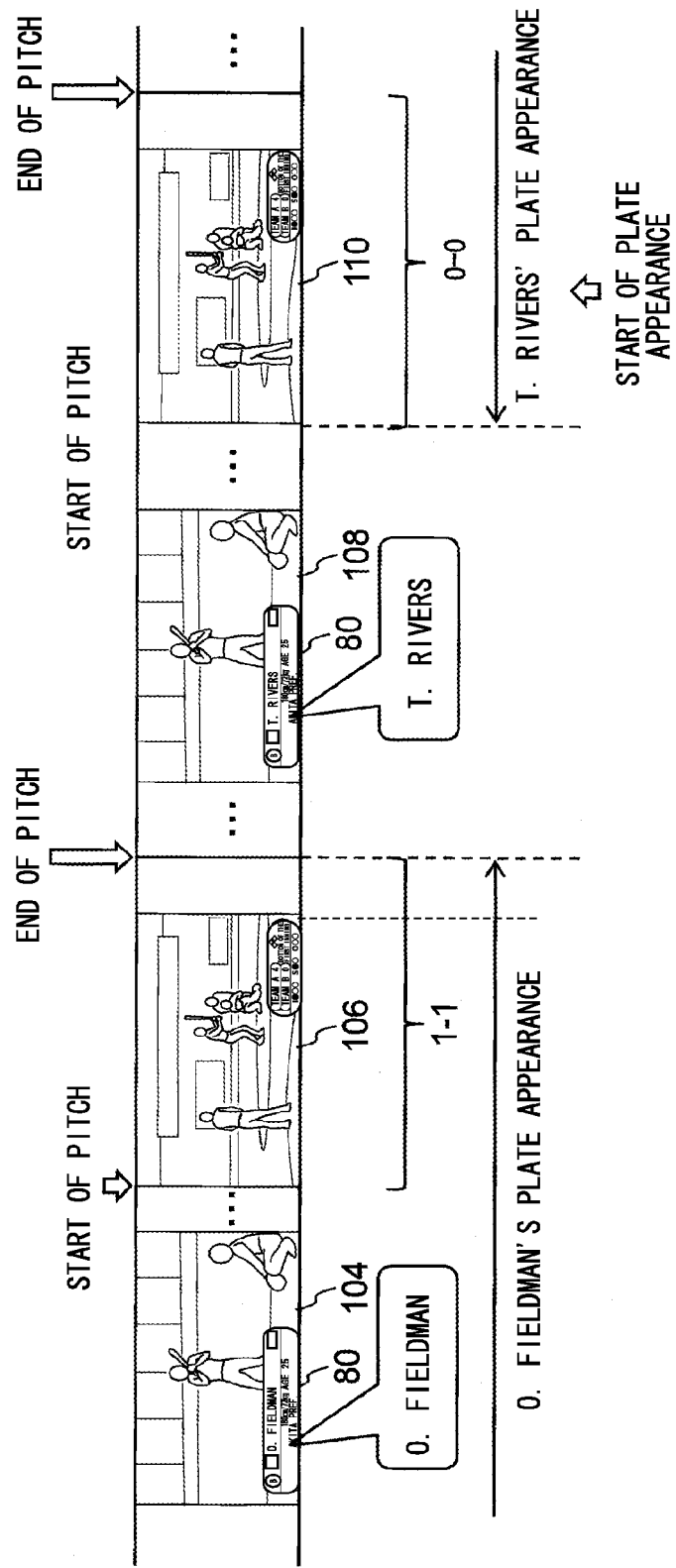
FIG. 16 is a diagram explaining frames representing the starts of pitches, frames representing the ends of pitches, and a segment representing the start of a plate appearance and player identification data corresponding to a plate appearance.

FIG. 16 schematically illustrates an example in which frames representing the starts of pitches, frames representing the ends of pitches, a segment representing the start of a plate appearance, and player identification data corresponding to plate appearances are detected. In the example of FIG. 16, a segment starting from a frame 110 is detected as a segment representing the start of a plate appearance. Accordingly, a segment starting from a frame 106 becomes a segment representing the end of a plate appearance. Then, "O. Fieldman" is detected as the player name corresponding to a plate appearance ending at the segment starting from the frame 106 including from a frame 104 up to the frame 106. From a frame 108 following the frame 106, "T. Rivers" is detected as the player name corresponding to the plate appearance starting from the segment starting from the frame 110.

Next, at step S30, the generation section 28 generates metadata that associates data representing the starts of the pitches to time data associated to the frames representing the start of a pitch as detected by the first detection section 22. Similarly, the generation section 28 generates metadata that associates data representing the ends of the pitches to time data associated to the frames representing the end of a pitch as detected by the first detection section 22.

Next, at step S32, the generation section 28 generates metadata that associates data representing the start of a plate appearance to time data associated to the leading frames in the segments detected by the second detection section 24. Similarly, the generation section 28 generates metadata that associates data representing the end of a plate appearance to time data associated to the final frames in the segments prior to the segment detected by the second detection section 24.

Next, at step S34, the generation section 28 generates metadata that associates player identification data that the third detection section 26 detected to correspond to a segment representing a plate appearance to that segment representing the plate appearance.

Next, at step S36, the generation section 28 generates the metadata file that stores the plural metadata generated at steps S30 to S34 above in the sequence of the time data included in the metadata. Then, the generated metadata file is appended to the edited footage, and transmitted to the distribution device 30 as the metadata appended footage by the generation section 28, and the baseball footage metadata generation processing ends.

Figure 15:
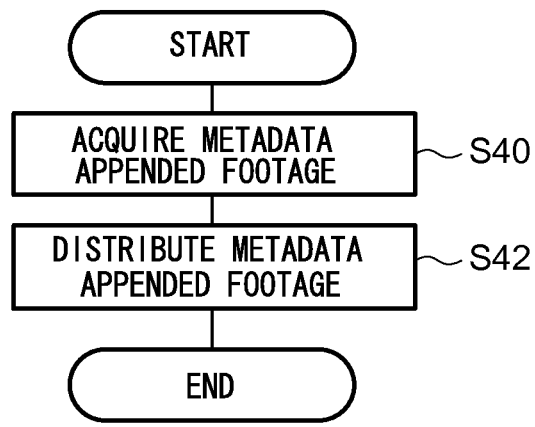
FIG. 15 is a flowchart illustrating an example of distribution processing.

Next, at step S40 of the distribution processing illustrated in FIG. 15, the distribution section 34 acquires the metadata appended footage transmitted from the baseball footage metadata generation device 20. Next, at step S42, the metadata appended footage is converted to distribution footage according to the specified standards, and distributed to the distribution destination terminal (omitted from illustration in the drawings) by the distribution section 34, and distribution processing ends.

As explained above, according to the baseball footage metadata generation device 20 according to the first exemplary embodiment, frames representing the specific cut captured in the batter-direction from behind the pitcher are extracted from footage captured of a baseball game. Then, segments in which the frames representing this specific cut are consecutive are employed as segments representing a single pitch by a pitcher, and segments in which the obtained ball count display in that segment enters the initial state are detected as segments representing the start of a plate appearance. Then, metadata is generated in which the player identification data from the frames detected to correspond to the segment representing the start of the plate appearance is associated to the segment representing the corresponding plate appearance. Automatic generation of metadata enabling association of player identification data to footage of each plate appearance, and cueing therefrom, from captured footage of a baseball game is thereby enabled.

The metadata appended footage according to the technology disclosed herein enables cueing in pitch units and plate appearance units, and enables identification of players, in baseball game footage (the captured footage, or the edited footage) based on the metadata. This enables, for example, simple specification and viewing of footage during a pitcher's pitch, footage of a batter's plate appearance, footage of a specified player, replays, or the like.

Although explanation has been given in the first exemplary embodiment regarding a case in which player identification data is detected by employing a batter list, there is no limitation thereto. For example, in cases in which the overlay 80 displaying player data includes a display indicating whether the player displayed by that overlay is a batter, a pitcher, a pinch runner, and so on, character recognition may be performed with this display. Such cases enable prevention of erroneous detection of player identification data of pitchers and pinch runners, even without employing the batter list 30.

Moreover, the configuration (composition) of a screen differs between cases in which the overlay 80 that displays player data is displaying for a batter, and cases in which the display is for a pitcher or a pinch runner. An overlay 80 that displays player data displaying for a batter may be selected based on the different screen configuration, and player identification data detected.

Second Exemplary Embodiment

Next, explanation follows with regards to a second exemplary embodiment. Note that the same reference numerals are appended for parts similar to those of the footage distribution system 10 according to the first exemplary embodiment, and detailed explanation thereof is omitted.

As illustrated in FIG. 1, a footage distribution system 210 according to the second exemplary embodiment includes a baseball footage metadata generation device 220, and a distribution device 30. The baseball footage metadata generation device 220 includes a first detection section 22, a second detection section 24, a third detection section 226, and a generation section 28.

Similarly to the third detection section 26 of the first exemplary embodiment, the third detection section 226 detects player identification data based on the overlay 80 that displays player data included in frames corresponding to the segment representing the start of the plate appearance as detected by the second detection section 24.

Sometimes player identification data corresponding to a plate appearance is not detectable from the frames corresponding to the segment representing the start of the plate appearance, such as when a batter makes a bat and the plate appearance ends before the overlay 80 that displays player data is displayed.

Thus, the third detection section 226 predicts identification data of undetectable players using the batter list 30 that includes batting sequence data. Specifically, the third detection section 226 predicts player identification data for a plate appearance for which prediction is desired based on the batting sequence data included in the batter list 30, or player identification data detected to correspond to the plate appearance before and after the plate appearance for which prediction of player identification data is desired, or both.

Figure 17:
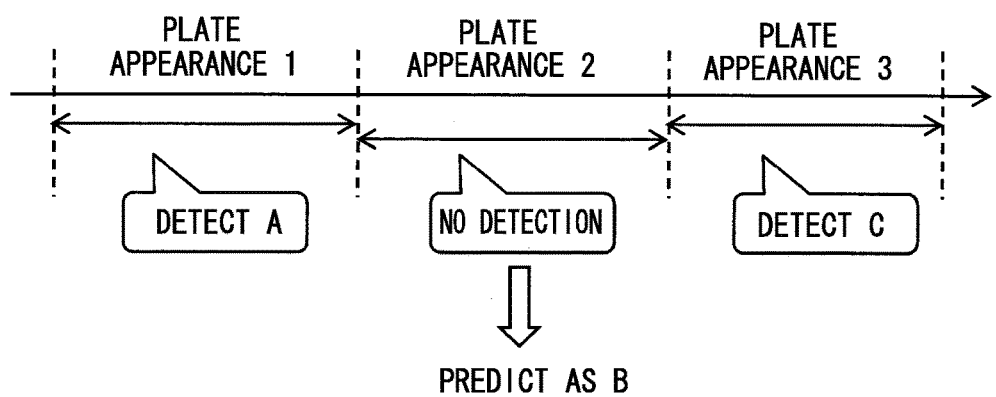
FIG. 17 is a diagram explaining prediction of player identification data.

For example, as illustrated in FIG. 17, in consecutive plate appearance 1, plate appearance 2, and plate appearance 3, player name "A" is detected corresponding to the plate appearance 1, player name "C" is detected corresponding to the plate appearance 3, and no player name is detected corresponding to the plate appearance 2. In such cases, the third detection section 226, for example, cross-references the batter list 30 such as that illustrated in FIG. 8, and predicts "B" that is between "A" and "C" in the batting sequence, as the player name corresponding to the plate appearance 2.

The operation of the footage distribution system 210 according to the second exemplary embodiment only adds prediction processing of player identification data using the batter list 30 at step S28 to the baseball footage metadata generation processing of the first exemplary embodiment illustrated in FIG. 14, and explanation thereof is therefore omitted.

As explained above, according to the baseball footage metadata generation device 220 according to the second exemplary embodiment, when player identification data corresponding to the plate appearance is not detectable from the frames, prediction is made by cross-referencing the batting sequence data included in the batter list, against player identification data of the previous and next plate appearance. Thus, a reduction in player identification data that escapes detection is enabled.

Figure 18:
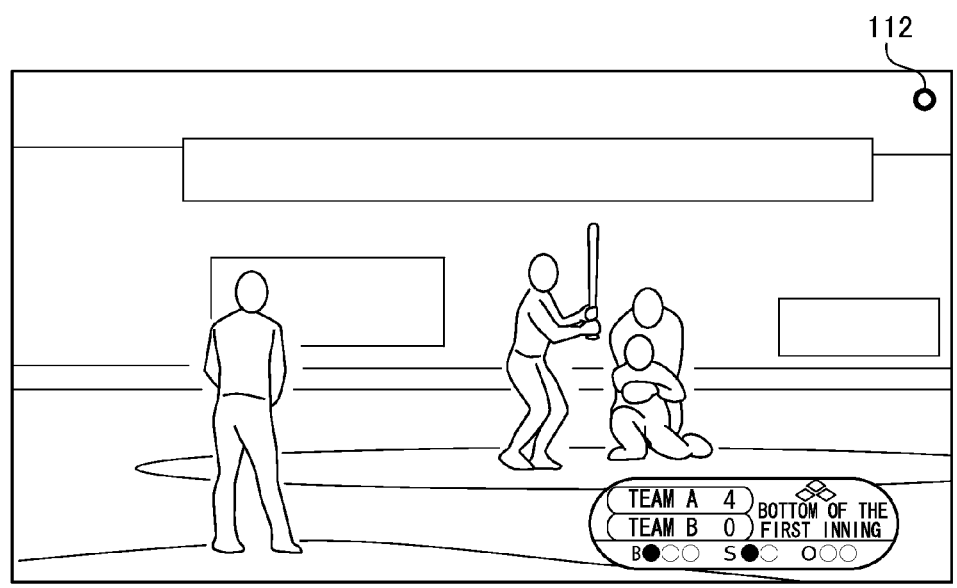
FIG. 18 is a diagram explaining an example of a mark serving as identification data.

Although explanation has been given for each of the exemplary embodiments above for cases in which a frame representing a specific cut is detected based on image characteristics of each frame, there is no limitation thereto. For example, in cases in which edited footage, to which identification data that identifies the specific cut is pre-added to the frames representing the specific cuts, is input, the frames representing the specific cut may be detected using this identification data. The identification data may be added to edited footage as, for example, a mark 112 like that illustrated in FIG. 18.

The identification data may be added during capture of the captured footage, or may be added during editing of the captured footage. For example, a switch may be provided to a camera capturing in the batter-direction from behind the pitcher, and configuration made such that the identification data is added to the captured footage captured by the camera while the switch is pressed. Moreover, configuration may be made such that identification data is always added to any captured footage captured by a camera capturing in the batter-direction from behind the pitcher. The mark 112 is identification data that may be added during editing to add an overlay or the like to captured footage.

Specifically, the first detection section 22 identifies whether or not identification data is added for each frame of edited footage. For example, the first detection section 22 may identify whether or not identification data is added by performing pattern matching, using a pattern representing the identification data, in a predetermined region of each frame. The first detection section 22 extracts as frames representing the specific cut, frames to which identification data is identified to have been added.

When footage in which identification data has been added to the frames indicating the specific cut in this manner can be acquired, this enables detection of frames representing the specific cut to be made by simple processing.

In cases in which the identification data is added during capturing or editing as described above, sometimes the identification data is not added in the exact place where transition is made between a frame other than the frames representing specific cuts, and a frame representing a specific cut. In such cases, the first detection section 22 may detect as the frame representing the start or end of a pitch, a frame several frames before, or after the frames representing the specific cut extracted based on the identification data. In each of the exemplary embodiments above also, a frame several frames before, or after the extracted frames representing the specific cut may be detected as a frame representing the start, or end of a pitch.

Figure 19:
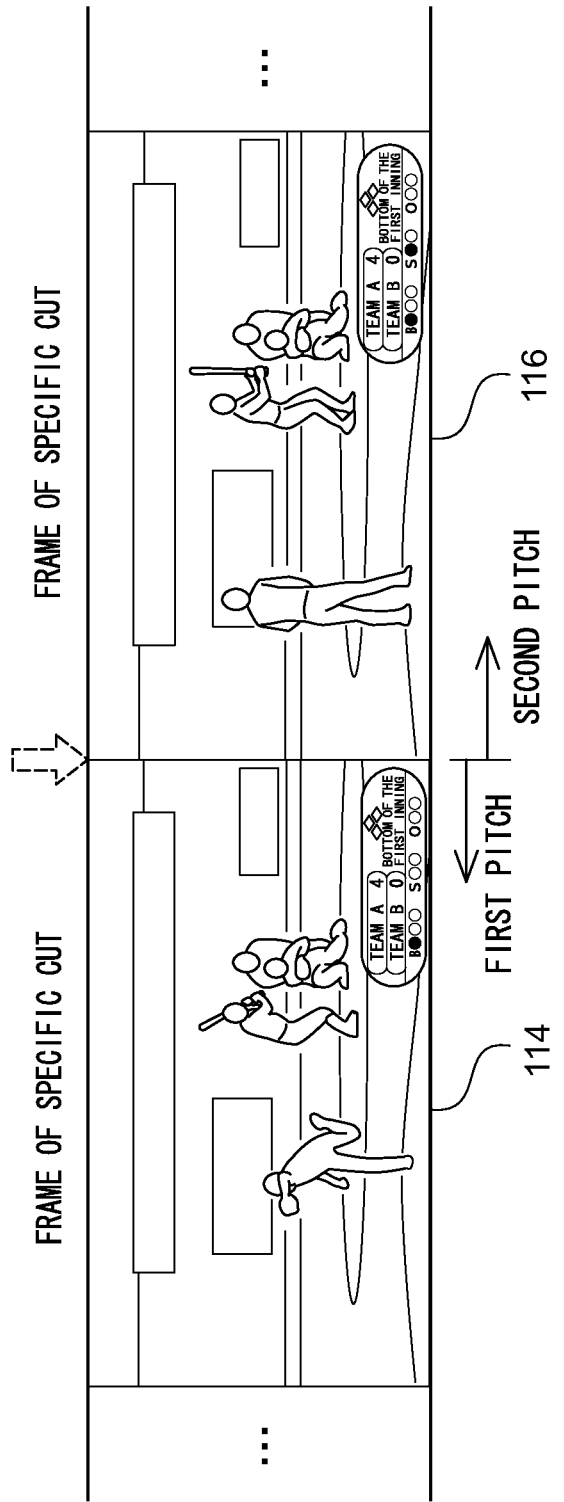
FIG. 19 is a diagram explaining a case in which plural pitching scenes are included in the same specific cut.

Although in each of the exemplary embodiments above explanation has been given regarding cases in which segments in which frames representing a specific cut are consecutive are detected as segments representing a pitch, it is conceivable that plural pitching scenes may be included in a single specific cut in the captured footage. For example, as illustrated in FIG. 19, a frame 114 is considered the end of footage of the first pitch, and a following frame 116 onward is considered footage of the second pitch. Since the frame 114 and the frame 116 are both frames representing specific cuts, footage between the two frames, of cuts different from specific cuts between the beginning and end of a pitch are not included. A situation like that illustrated in FIG. 19 may arise of a case in which, for example, plural pitches delivered by a pitcher (for example, two pitches) are captured in the captured footage, without the footage including footage captured by cameras other than the camera capturing the specific cut.

The first detection section 22 extracts the ball count display from the overlay 82, displaying game status, included in each of the frames representing specific cuts. Then, a frame among the consecutive frames representing the specific cut at which the ball count display changes may be detected as a frame corresponding to the start of a pitch. Then, the generation section 28 may denote a frame a specified amount of frames before or after the frame corresponding to the start of the pitch detected by the first detection section 22 based on the change to the ball count display as a frame representing the start of the pitch. The specified amount of frames before or after may be a predetermined number of frames corresponding to the time from the start of a pitch until the ball count display changes, or the time from when the ball count display changes until the pitcher starts the next pitch, based on past game footage or the like.

In such cases, generation of metadata indicating the start of each pitch is enabled even when plural pitching scenes are included in the same specific cut.

Figure 20:
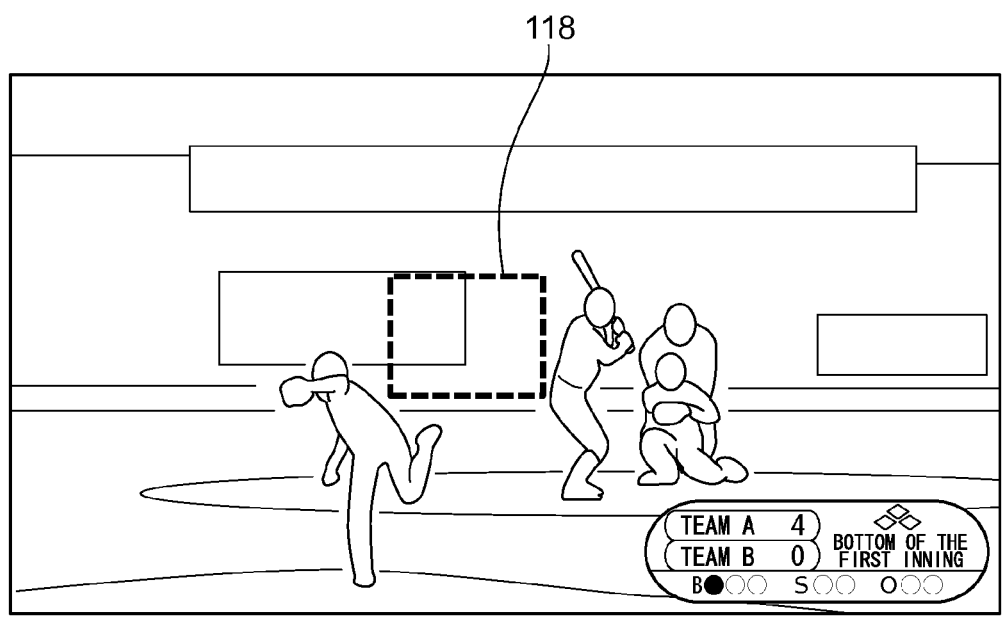
FIG. 20 is a diagram explaining a specified region for detecting a trajectory of a ball.
Figure 21:
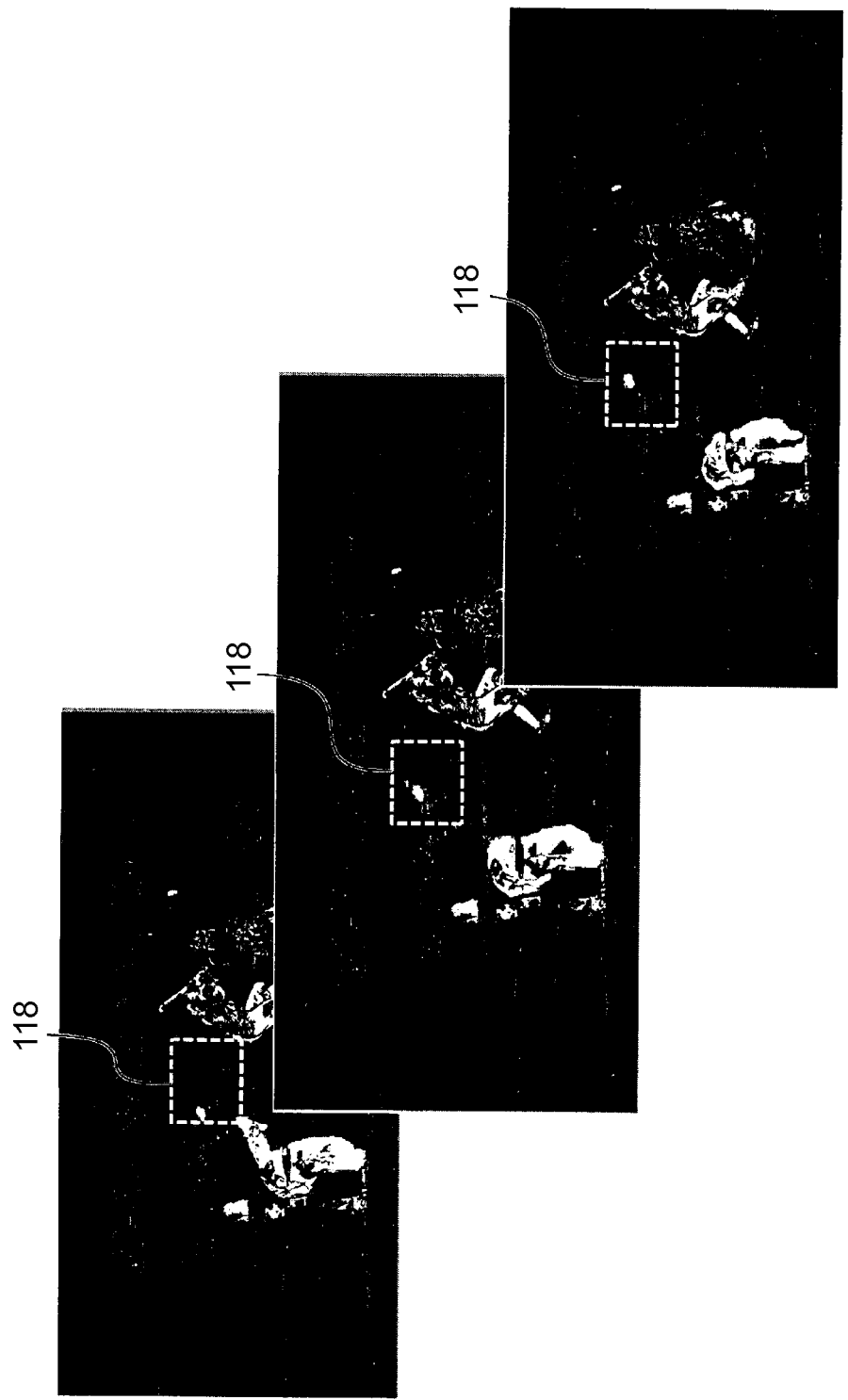
FIG. 21 is a diagram illustrating an example of difference image.

The first detection section 22 may detect as a frame corresponding to the start of a pitch, frames in which a ball trajectory that indicates a pitch in a specified direction by a pitcher appears in a specified region of frames representing plural consecutive specific cuts during consecutive frames representing specific cuts. As illustrated in FIG. 20 for example, a specified region 118 is set between the pitcher and the batter. For example, as illustrated in FIG. 21, the first detection section 22 produces a difference image representing differences between corresponding pixels between the frames representing the consecutive specific cuts. In FIG. 21, the further forward the difference image, the more recent the time data of the source frame. Moreover, in FIG. 21, difference images of the whole of the frames are illustrated; however, a difference image may be produced of the specified region 118 alone.

Figure 22:
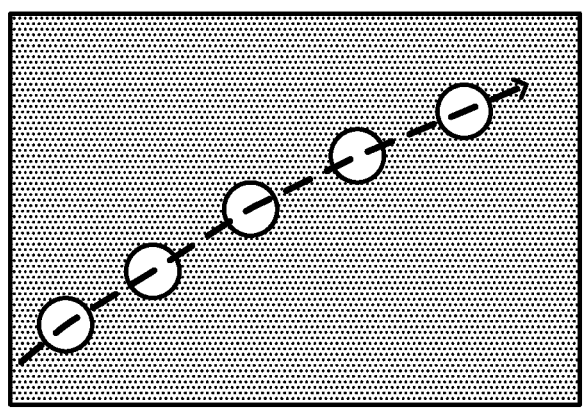
FIG. 22 is a diagram explaining detection of a trajectory of a ball.

When a ball trajectory appears by, for example overlaying plural consecutive difference images, the first detection section 22 determines whether or not the direction of the trajectory is in the specified direction. An example in which 5 difference images are overlaid is illustrated in FIG. 22. Each of the white circles in FIG. 22 is a difference region corresponding to the ball that appears in each difference image, illustrating an example in which the ball trajectory illustrated by the dashed arrow appears due to overlaying the difference images.

Figure 23:
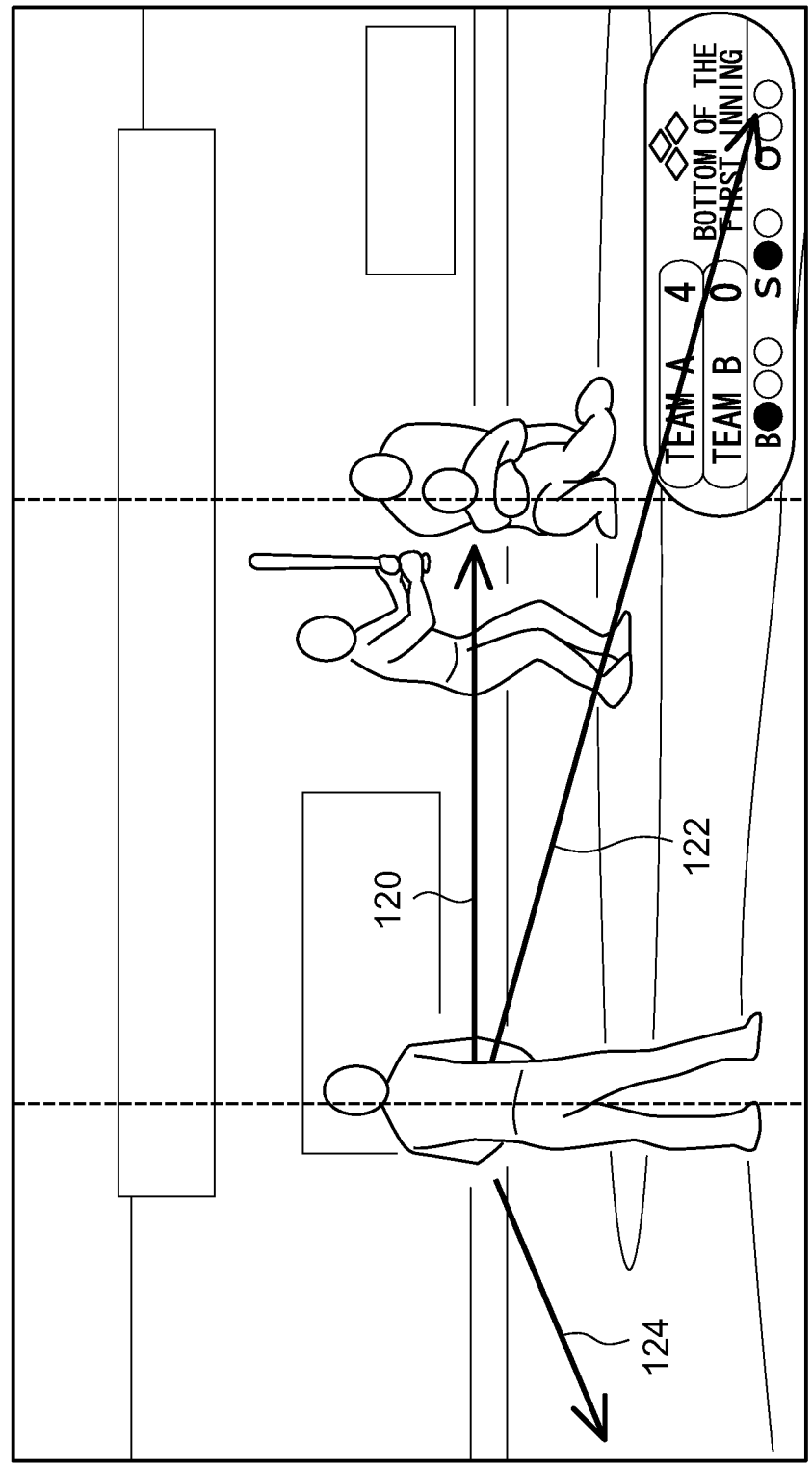
FIG. 23 is a diagram explaining the direction of a trajectory of a ball.

The specified direction is, for example, a direction in the edited footage (or may be in the captured footage) in which the thrown ball travels during a pitcher's pitch. The specified direction may be predetermined, or a position in a captured image of a person such as a batter, catcher, or an umpire may be specified, and the specific direction determined based on the position of the specified person. Although the specified direction is a direction indicating the ball trajectory, a direction enabling distinction between pitches toward the batter, and pickoffs, may also be predetermined. For example, as illustrated in FIG. 23, in a frame representing a specific cut, an arrow 120 indicates a pitch direction toward the batter, and an arrow 122, and an arrow 124 indicate directions of pickoffs. Accordingly, the direction of an arrow 120 may be determined as the specified direction in the example of FIG. 23. The region in which the ball trajectory is detected may also be set as a region able to detect pickoffs, such that whether the detected ball trajectory is a trajectory indicating a pitch toward the batter, or a trajectory indicating a pickoff (a trajectory in the direction of the arrow 122, or the arrow 124 in FIG. 23), are determined in combination. Pitches to the batter are thereby distinguishable from pickoffs in the edited footage (or may be in the captured footage).

The generation section 28 generates metadata that designates as frames corresponding to the start of a pitch, frames a specified amount of frames before frames corresponding to the start of a pitch, detected based on the ball trajectory by the first detection section 22. The specified amount of frames before may be a predetermined number of frames corresponding to a period from the start of a pitch, until the actual pitch has been delivered, based on past game footage or the like.

In such cases, even when plural pitching scenes are included in the same specific cut, generation of metadata indicating the start of each pitch is enabled. Generation of metadata based on the trajectory of the ball may also be executed in addition to generating metadata indicating the start of a pitch based on changes to the ball count display. In such cases, for example, even when the ball count display does not change, such as in cases in which a batter bats a foul after two strikes, detection of the start of a pitch with good precision is enabled.

Although explanation has been given in each of the above exemplary embodiments regarding cases in which segments in which the ball count is in the initial state (0-0) are detected as segments representing the start of a plate appearance, in such cases detection as a segment representing the start of a plate appearance is possible, even in scenes in which the batter does not change. Thus, configuration may be made such that the second detection section 24 does not detect a segment representing the start of a plate appearance when a change of batter does not ensue even when the ball count display displays the initial state in each of plural consecutive segments.

Specifically, when the total of the number of runners, the out count, and the score increases by 1 between a former segment and a latter segment of consecutive segments, the second detection section 24 also detects the latter segment as a segment representing the start of a plate appearance. However, when the total does not change, the second detection section 24 does not detect the latter segment as a segment representing the start of a plate appearance. This is because an increase of 1 in the total of the number of runners, the out count, and the score indicates a change in the batter, and when the total does not change, this indicates that the batter has not changed. As an example, FIG. 24 illustrates whether or not the batter changes for respective outcome results of a current pitch when the status prior to the pitch was a number of runners of 1, an out count of 0, and a score of 0. In FIG. 24, a hit, an RBI hit, a homerun, an out, a double play, a sacrifice fly squeeze, and a sacrifice hit (only to gain a base) are all events in which the batter changes in a baseball game. However, a pickoff, a wild pitch, or the like, are events in which the batter does not change in a baseball game. The second detection section 24 may save the data illustrated in FIG. 24 to the storage section 46 or the like, and determine whether or not there is a change in batter.

FIG. 24 is an example of data determining whether or not there is a change in batter for respective outcome results of a pitch, and there is no limitation to the format of FIG. 24. For example, although the state before the pitch is notated in FIG. 24 for the sake of explanation, the second detection section 24 may determine whether or not there is a change in batter based on data indicating the number of runners, the out count, attributes, totals, and whether or not there is a change in batter. Moreover, although FIG. 24 illustrates a case in which the number of runners is 1, the second detection section 24 may determine whether or not there is a change in batter by a procedure similar to the processing described above, even when the number of runners is not 1. Alternatively, the second detection section 24 may perform determination of foul balls and the like by performing determination as to whether or not there is a change in batter in a situation in which, for example, two pitches have been counted as strikes.

Figure 25:
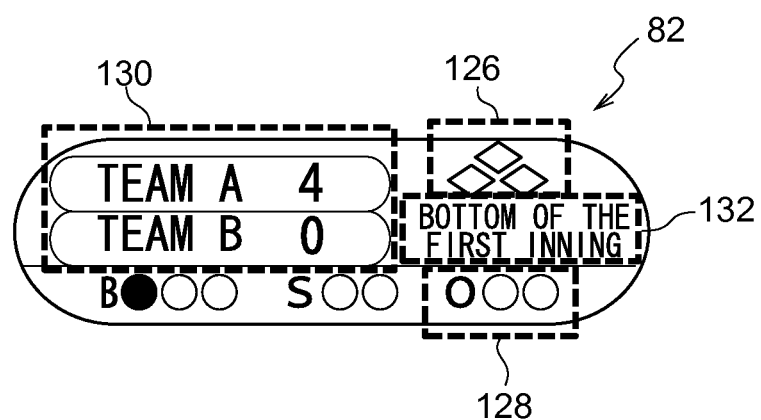
FIG. 25 is a diagram illustrating an example of an overlay displaying game status.

As illustrated in FIG. 25, the second detection section 24 extracts an on-base display 126 displaying an on-base status, an out count display 128 displaying the out count, and a score display 130 displaying the score for each team from the overlay 82 displaying game status. The second detection section 24 moreover acquires the number of runners indicated by the extracted on-base display 126, the out count indicated by the out count display 128, and the score of the batting team indicated by the score display 130. Acquisition of this data may be performed by pattern matching, or character recognition processing on each extracted display.

The batting team may be determined based on data obtained from an innings display 132, displaying the current innings, of the overlay 82 displaying game status.

Thus, configuration can be made such that a segment representing the start of a plate appearance is not detected even when the ball count is 0-0 when it has been determined that there has been no change in batter based on the changes to the display displaying the game status. More precise detection of the start of plate appearances is thereby enabled.

Although explanation has been given regarding a case in which whether or not there is a change in batter is determined based on changes to the total of the number of runners, the out count, and the score, there is no limitation thereto. Determination may be made by comparing how patterns of the number of runners, the out count, and the score, have changed from a previous segment against predetermined patterns. For example, a pattern in which the number of runners decreases by 1, the out count increases by 1, and the score does not change, is established as a pattern indicating that the batter does not change. Configuration may be made such that the subsequent segment is not detected as a segment representing the start of a plate appearance, when the changes to the number of runners, the out count, and the score from the previous segment correspond to this established pattern.

Moreover, in addition to detection of the start of a plate appearance, detection may be made of the start of an inning. For example, the second detection section 24 may acquire the ball count, the number of runners, and the out count. Then, the second detection section 24 may detect as the start of an inning, a frame or plate appearance at which the out count and the number of runners transitions to 0 with the ball count at (0-0). This thereby also enables detection of the starts of innings, in addition to detection of the starts of plate appearances. Alternatively, when discovered that the innings have changed based on the data obtained from the innings display 132, displaying the current innings, of the overlay 82, the second detection section 24 may detect the frame or plate appearance at which the change was discovered as the start of an inning.

Although explanation has been given in each exemplary embodiment described above in which a cut captured in the batter-direction from behind the pitcher is considered the specific cut, the specific cut is not limited thereto. For example, it is sufficient that the specific cut is a cut captured at a characteristic camera angle employed in pitchers' pitching scenes, such as a cut captured from a camera mounted to the head of the umpire (a cut captured from the umpire in the pitcher-direction).

Although explanation in each of the above exemplary embodiments has been given regarding cases in which respective frames representing the starts of pitches, and frames representing the ends of pitches are detected based on specific cuts, there is no limitation thereto. For example, frames a specified amount of frames before a frame representing the next pitch may be detected as frames representing the ends of pitches.

When replays and digests are included in the footage input to the baseball footage metadata generation device, frames representing the start of a pitch may be detected from a portion from which these are excluded. For example, replays are playback of footage of the previous play, or previous plate appearance, during a comparatively short period in an inning, and digest footage is playback of footage such as a review of the game status up until that point, during a comparatively long period such as between innings. Exclusion of footage portions of replays and digests is enabled by, for example, recognition of overlays displaying that footage is a replay or a digest.

In the case of replay footage, sometimes footage captured from a different camera angle, or footage zoomed in on a given portion is played back. Since the replayed footage is not extracted as a specific cut in such cases, there is no effect on the detection of the frames representing the start of a pitch. Sometimes slow-motion footage is employed as replay footage. In consideration of such cases, frames of slow-motion footage may be excluded from the frames extracted as frames representing the specific cut. Exclusion of slow-motion footage is enabled by, for example, slow-motion determination such as determining whether or not the same frame is repeated a specified number of times.

Although explanation has been given in each exemplary embodiment described above of examples in which in the footage distribution system includes a distribution device, and a baseball footage metadata generation device, there is no limitation thereto. Each functional section of the distribution device, and each functional section of the baseball footage metadata generation device may be implemented by a single computer.

Output from the baseball footage metadata generation device may be used in applications other than a footage distribution system.

Although explanation has been given above of a mode in which the baseball footage metadata generation program 50 is pre-stored (installed) on the storage section 46, and the distribution program 70 is pre-stored (installed) on the storage section 66, provision may be made in a recorded format on a recording medium, such as a CD-ROM, a DVD-ROM, or the like.

One aspect exhibits an advantageous effect of enabling identification of the player of a plate appearance from captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a displaying of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A data processing method, comprising:
   by a processor, in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;
   storing the identified name in a storage device as a batter name corresponding to the group of frames related to the given plate appearance;
   detecting, as a segment representing a start of the given plate appearance, a segment in which a ball count display included in at least one frame displays an initial state, from among segments of consecutive frames representing specific cuts taken by a camera angle used in a pitcher's pitching scene included in the captured baseball game footage; and wherein the group of frames representing the start of the given plate appearance include frames from an end of a previous segment representing a plate appearance that is previous to the given plate appearance, up to the end of a next segment representing the start of the given plate appearance.

2. A data processing device, comprising:

a processor configured to execute a process, the process comprising:

in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;

storing the identified name in a storage device as a batter name corresponding to the group of frames related to the given plate appearance;

detecting, as a segment representing a start of the given plate appearance, a segment in which a ball count display included in at least one frame displays an initial state, from among segments of consecutive frames representing specific cuts taken by a camera angle used in a pitcher's pitching scene included in the captured baseball game footage; and wherein the group of frames representing the start of the given plate appearance include frames from an end of a previous segment representing a plate appearance that is previous to the given plate appearance, up to the end of a next segment representing the start of the given plate appearance.

3. A non-transitory recording medium storing a data processing program that causes a computer to execute a process, the process comprising:

in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;

storing the identified name in a storage device as a batter name corresponding to the group of frames related to the given plate appearance;

detecting, as a segment representing a start of the given plate appearance, a segment in which a ball count display included in at least one frame displays an initial state, from among segments of consecutive frames representing specific cuts taken by a camera angle used in a pitcher's pitching scene included in the captured baseball game footage; and wherein the group of frames representing the start of the given plate appearance include frames from an end of a previous segment representing a plate appearance that is previous to the given plate appearance, up to the end of a next segment representing the start of the given plate appearance.

4. The non-transitory recording medium of claim 3, the process further comprising:

extracting, as a reference, a frame in which a ball count display corresponds to an initial state from the group of frames related to the given plate appearance.

5. The non-transitory recording medium of claim 3, the process further comprising:

extracting, as a leading frame of the group of frames, a frame corresponding to a pitching scene immediately prior to a frame in which a ball count display corresponds to an initial state.

6. A non-transitory recording medium storing a data processing program that causes a computer to execute a process, the process comprising:

in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;

storing the identified name in a storage device as a batter name corresponding to the group of frames related to the given plate appearance; and in cases in which display of the player name is not included in the group of frames related to the given plate appearance, predicting the batter name for the given plate appearance based on the batter list and a second batter name identified from a group of frames related to a plate appearance preceding the given plate appearance and a third batter name identified from a group of frames related to a plate appearance following the given plate appearance.

7. A data processing method, comprising:

by a processor, in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;

in cases in which display of the player name is not included in the group of frames related to the given plate appearance, predicting the batter name for the given plate appearance based on the batter list and a second batter name identified from a group of frames related to a plate appearance preceding the given plate appearance and a third batter name identified from a group of frames related to a plate appearance following the given plate appearance; and storing the identified name in a storage device as a batter name corresponding to the group of frames related to the given plate appearance.

8. A data processing device, comprising:

a processor configured to execute a process, the process comprising:

in cases in which display of a player name is included in one or more frames among a group of frames related to a given plate appearance extracted from captured baseball game footage that includes a plurality of frames, extracting character data that is represented by the display of the player name by performing character recognition processing on the one or more frames, and identifying the displayed player name as the name of a batter of the given plate appearance by cross-referencing the extracted character data against a pre-stored batter list;

in cases in which display of the player name is not included in the group of frames related to the given plate appearance, predicting the batter name for the given plate appearance based on the batter list and a second batter name identified from a group of frames related to a plate appearance preceding the given plate appearance and a third batter name identified from a group of frames related to a plate appearance following the given plate appearance; and storing the identified name in a storage device as a batter name corresponding to the group of frames related to the given plate appearance.

* * * * *